United States Patent
Li

(10) Patent No.: US 7,514,180 B2
(45) Date of Patent: Apr. 7, 2009

(54) BATTERY WITH MOLTEN SALT ELECTROLYTE AND PROTECTED LITHIUM-BASED NEGATIVE ELECTRODE MATERIAL

(75) Inventor: Wen Li, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 175 days.

(21) Appl. No.: 11/080,960

(22) Filed: Mar. 15, 2005

(65) Prior Publication Data

US 2006/0019167 A1    Jan. 26, 2006

Related U.S. Application Data

(60) Provisional application No. 60/553,621, filed on Mar. 16, 2004, provisional application No. 60/553,457, filed on Mar. 16, 2004.

(51) Int. Cl.
*H01M 4/64* (2006.01)

(52) U.S. Cl. .................................. 429/231.95; 429/233

(58) Field of Classification Search .............. 429/218.1, 429/231.95, 144, 129, 137
See application file for complete search history.

(56) References Cited

U.S. PATENT DOCUMENTS

| | | | |
|---|---|---|---|
| 4,965,146 A * | 10/1990 | McCullough et al. ....... | 429/102 |
| 5,314,765 A * | 5/1994 | Bates ..................... | 429/231.95 |
| 5,869,208 A * | 2/1999 | Miyasaka .................. | 429/224 |
| 6,214,061 B1 | 4/2001 | Visco et al. ................ | 29/623.5 |
| 6,245,847 B1 * | 6/2001 | Green et al. ................ | 524/418 |
| 6,326,104 B1 | 12/2001 | Caja et al. .................... | 429/188 |
| 6,495,287 B1 | 12/2002 | Kolb et al. .................. | 429/215 |
| 6,544,691 B1 | 4/2003 | Guidotti ..................... | 429/344 |
| 6,733,924 B1 | 5/2004 | Skotheim et al. ....... | 429/231.95 |
| 2001/0053475 A1* | 12/2001 | Ying et al. .................. | 429/137 |
| 2003/0113624 A1* | 6/2003 | Kim et al. ................... | 429/213 |
| 2005/0186469 A1* | 8/2005 | De Jonghe et al. .......... | 429/137 |

* cited by examiner

*Primary Examiner*—Patrick Ryan
*Assistant Examiner*—Monique Wills
(74) *Attorney, Agent, or Firm*—Gifford, Krass, Sprinkle, Anderson & Citkowski, P.C.

(57) ABSTRACT

A battery comprises a negative electrode including a negative electroactive material, a positive electrode, an electrolyte located between the negative electrode and the positive electrode, and a protection layer, the protection layer separating the electrolyte and the negative electroactive material. Example batteries include lithium batteries and lithium-sulfur batteries having a molten salt electrolyte. The negative electroactive material may be a lithium-containing material such as lithium metal, lithium alloy, or other lithium compound. In other battery technologies, the negative electroactive material may comprise another alkali metal, alkaline earth metal, or other material. The protection layer may comprise a solid polymer electrolyte or other ion-transmissive material.

14 Claims, 1 Drawing Sheet

BATTERY WITH MOLTEN SALT ELECTROLYTE AND PROTECTED LITHIUM-BASED NEGATIVE ELECTRODE MATERIAL

REFERENCE TO RELATED APPLICATION

This application claims priority to U.S. Provisional Patent Application Ser. Nos. 60/553,621 and 60/553,457, both filed Mar. 16, 2004, the entire contents of which are incorporated herein by reference.

FIELD OF THE INVENTION

The present invention relates to batteries, in particular to lithium ion and lithium sulfur batteries.

BACKGROUND OF THE INVENTION

Safety is a key issue for batteries, particularly in automobile applications. Organic electrolytes have high vapor pressure, and are often flammable. Molten salt electrolytes have a high melting point and low vapor pressure, compared with organic electrolytes. Therefore, batteries using molten salt electrolytes have the potential for higher safety than those using organic electrolytes. Unfortunately, the molten salt electrolyte can break down in a lithium-based battery, leading to degraded performance. Hence, there is an urgent need for improved lithium-based batteries that can be used reliably in numerous applications.

The lithium sulfur (Li—S) battery has been extensively studied for automobile applications. However, practical use of the Li—S battery is constrained by severe safety problems, and other problems such as self-discharge and low utilization of the sulfur positive electrode. The safety problem is mainly caused by reactions between a low potential Li-metal negative electrode and the flammable organic electrolyte used in a conventional Li—S battery. Furthermore, the organic electrolytes are critical to self-discharge and utilization of sulfur positive electrode. Thus, development of new electrolytes for the Li—S battery is necessary.

The theoretical energy density of a Li—S battery is 2600 Wh/kg, which is much higher than that of a Li-ion battery (510 Wh/kg). Hence, if the safety problem could be overcome, the Li—S battery would find widespread applications in place of the Li-ion battery, and also in place of other batteries failing to provide the high capacity and other advantages of the Li—S battery system. Hence, safety improvements in the field of Li—S batteries have widespread technological significance.

U.S. Pat. No. 5,314,765 to Bates describes a battery having a layer of lithium phosphorus oxynitride coating a lithium negative electrode. However, Bates only describes batteries having organic-based electrolytes, stating that the electrolyte layer can comprise a solid organic polymer containing an inorganic lithium salt, or an organic liquid containing a dissolved lithium salt. No other electrolyte compositions are discussed.

SUMMARY OF THE INVENTION

A battery comprises a negative electrode, containing a negative electroactive material, a positive electrode, a molten salt electrolyte located between the negative electrode and the positive electrode, and a protection layer, the protection layer separating the molten salt electrolyte and the negative electroactive material. Example batteries include lithium-ion batteries and lithium-sulfur batteries. The molten salt electrolyte may includes a lithium salt, and in the case of a lithium-sulfur battery, may prevent dissolution of $Li_2S_x$ species, where $1 \geq x \geq 8$. The negative electroactive material may be a lithium-containing material such as lithium metal, lithium alloy, or other lithium compound, may be another alkali metal containing material in other battery technologies.

The negative electrode may contain particles of the negative electroactive material, the protection layer substantially surrounding the particles. The protection layer may comprises a solid polymer electrolyte, which may, for example, encase the negative electroactive material, for example in the form of a composite material, or may be in the form of a membrane of solid polymer electrolyte separating the negative electroactive medium from the molten salt electrolyte. The electrolyte layer may have a thickness greater than the thickness of a solid electrolyte used as a protection layer, so that the advantageous high ionic conductivity of the molten salt electrolyte may be combined with the enhanced safety of coating a reactive negative electroactive material with a solid ion-conducting protection layer.

The protection layer may include one or more atoms selected from the group consisting of P, S, N, O, C, H, B, Zr, Li, Sn, Ge, and Si. For example, the protection layer may be an oxide, carbide, nitride, sulfide, phosphide, or boride. The protection layer can be an organic layer, inorganic layer, or hybrid inorganic-organic layer.

DETAILED DESCRIPTION OF THE INVENTION

Figure 1A:
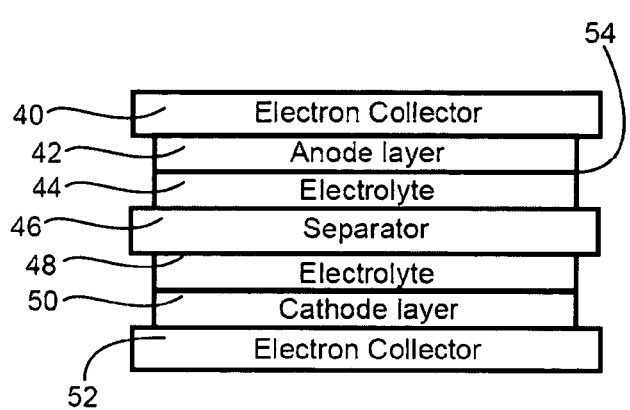
FIG. 1A shows a battery including a protection layer between a negative electrode layer and a molten salt electrolyte.

An improved battery according to an example of the present invention, such as lithium battery or lithium sulfur battery, is particularly well suited for high density battery applications. An example battery includes a protection layer, which may be a surface film, which separates the negative electrode from the molten-salt electrolyte.

For example, a protection layer can be applied to a lithium metal negative electrode. The protection layer preferably has high lithium ion conductivity. A protective layer, such as a surface film, can be provided on the negative electrode, such as Li-metal, using either thin film coating, or chemical vapor deposition, Li-alloy formation methods. A thin film on the Li-metal surface acts as a protection layer to separate the molten salt electrolyte and the lithium negative electrode. Therefore, the reaction between the electrolyte and the negative electrode will be reduced, and may be prevented. The protective film is preferably a thin film, such as a thin membrane, having a high Li-ion conductivity.

The composition of the protection layer can be either inorganic, or organic, or organic-inorganic hybrid. The protection layer can be a material including P, S, N, O, C, H, B, Zr, Li, Sn, Ge, Si, and the like. The protection layer can be a composite, alloy, or other material.

As used herein, the term battery refers to a device having a negative electrode, a positive electrode, and an electrolyte disposed between the negative electrode and the positive electrode. As used herein, the term 'battery' can refer to a device having one or more electrochemical cells.

The theoretical potential and capacity for a $Li_4Ti_5O_{12}$ negative electrode are 1.1 V and 150 mAh/g, respectively. In comparison, the theoretic potential and capacity for Li metal are 0 V and 3830 mAh/g, respectively. Thus, using a Li-metal negative electrode allow higher cell voltage and capacity.

However, due to problems of conventional battery design, the $Li_4Ti_5O_{12}$ negative electrode is commonly used. The oxidation potential of a molten salt electrolyte, particularly an electrolyte with reasonable lithium ion ($Li^+$) conductivity, is normally around 1.0V to 5.0V. A negative electrode with a lower voltage, such as lithium metal, can oxidize the molten salt electrolyte, leading to a decrease in the battery performance. For this reason, applications of negative electrode materials with low voltage and high capacity are limited. A lithium battery with a molten salt electrolyte and conventional design may use a negative electrode material with a higher reduction potential than the molten salt electrolyte, such as $Li_4Ti_5O_{12}$. However, examples of the present invention avoid common problems with low voltage negative electrode materials, allowing lithium metal negative electrodes to be used.

An improved lithium-sulfur (Li—S) battery includes a molten salt electrolyte that prevents dissolution $Li_2S_x$ species, where $1 \geq x \geq 8$, and a protected Li negative electrode which does not oxidize the molten salt electrolyte.

An example battery comprises a negative electrode, a first electron collector associated with the negative electrode, a positive electrode, and a second electron collector associated with the positive electrode, and an electrolyte layer located between the negative electrode and the positive electrode. The negative electrode comprises a negative electroactive material (or anode electroactive material), which in the case of a lithium battery may be lithium metal, a lithium alloy, or other lithium containing compound. The negative electrode may also include a non-electroactive electron-conductive material and a binder. Similarly, the positive electrode layer may comprise a positive material (or cathode electroactive material), electron conductive material, and binder. The electron conductive material and binder used in the positive electrode layer may be the same or different as the electron conductive material and binder used in the negative electrode layer.

For a lithium-sulfur battery, the positive electrode includes an electroactive sulfur containing material, which may be elemental sulfur. In examples of the present invention, the protection layer can be disposed to separate the negative electroactive material and the molten salt electrolyte, for example as a layer between the negative electrode and the molten salt electrolyte.

FIG. 1A shows a lithium battery. The battery comprises first electron collector 40, negative electrode layer or negative electrode 42, electrolyte shown as first and second electrolyte layers 44 and 48 respectively, separator 46 located within the electrolyte, positive electrode 50, second electron collector 52, and protection layer 54 surrounding the negative electrode layer. The separator is optional.

Figure 1B:
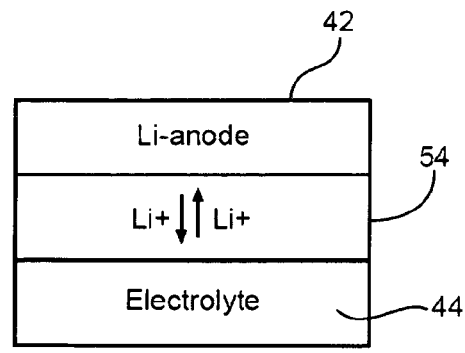
FIG. 1B further illustrates the function of the protection layer.

FIG. 1B shows the protection layer 54 located between the negative electrode layer 42 and the electrolyte layer 44. The negative electrode layer may have the structure shown above in FIG. 1A, or may be a film of negative electroactive material. In this example, the protection layer is conductive to lithium ions.

A molten salt electrolyte lithium battery can use similar materials for negative electrode, positive electrode, and/or electron collectors as used in an organic solvent type lithium battery.

Molten Salt Electrolytes

A molten salt electrolyte is an electrolyte comprising one or more salts, that is molten (or liquid) at the operating temperatures of the device using the electrolyte. A molten salt electrolyte can also be described as a molten, non-aqueous electrolyte, as an aqueous solvent is not required.

Molten salt electrolytes which may be used in embodiments of the invention are described in U.S. Pat. No. 4,463,071 to Gifford, U.S. Pat. No. 5,552,241 to Mamantov et al., U.S. Pat. No. 5,589,291 to Carlin et al., U.S. Pat. No. 6,326,104 to Caja et al., U.S. Pat. No. 6,365,301 to Michot, and U.S. Pat. No. 6,544,691 to Guidotti.

The molten salt electrolyte in the invention may include an onium, such as an ammonium, a phosphonium, an oxonium, a sulfonium, an amidinium, an imidazolium, a pyrazoliu, and a low basicity anion, such as $PF_6^-$, $BF_4^-$, $CF_3SO_3^-$, $(CF_3SO_2)N^-$, $(FSO_2)_2N^-$. The molten salt electrolyte in the invention may also include $Y^+N^-(-SO_2Rf^2)(-XRf^3)$, where $Y^+$ is a cation selected from the group consisting of an imidazolium ion, an ammonium ion, a sulfonium ion, a pyridinium, a(n) (iso)thiazolyl ion, and a(n) (iso) oxazolium ion, which may be optionally substituted with $C_{1-10}$ alkyl or $C_{1-10}$ alkyl having ether linkage, provided that said cation has at least one substituent of $-CH_2Rf^1$ or $-OCH_2Rf^1$ (where Rf is $C_{1-10}$ polyfluoroalkyl); $Rf^2$ and $Rf_3$ are independently $C_{1-10}$ perfluorophenyl or may together from $C_{1-10}$ perfluoroalkylene; and X is $-SO_2-$ or $-CO-$.

In a lithium-based battery, the molten salt electrolyte may contain a lithium salt such as one or more of the following: $LiPF_6$, $LiAsF_6$, $LiSbF_6$, $LiBF_4$, $LiClO_4$, $LiCF_3SO_3$, $Li(CF_3SO_2)_2N$, $Li(C_2F_5SO_2)_2N$, $LiC_4F_9SO_3$, $Li(CF_3SO_2)_3C$, $LiBPh_4$, LiBOB, and $Li(CF_3SO_2)(CF_3CO)N$. Examples of the present invention can also include other batteries, such as other alkali metal or other cation based batteries, in which case an appropriate salt is used.

For a lithium-sulfur battery, a molten salt electrolyte can be chosen from the described above that prevents dissolution of $Li_2S_x$ species, where $1 \geq x \geq 8$, and a protected Li negative electrode which does not oxidize the molten salt electrolyte.

Protection Layer Composition

The protection layer can be either inorganic, or organic, or an organic-organic hybrid material. The protection layer can include a material including one or more of the following atomic species: P, S, N, 0, C, H, B, Zr, Li, Sn, or Ge.

Protection layers for lithium batteries that can be used in examples of the present invention are disclosed in U.S. Pat. Nos. 6,402,795 and 6,413,284 to Chu et al. (such as lithium phosphorus oxynitride), and U.S. Pat. No. 6,214,061 to Visco et al.

Visco et al. suggest that the protection layer preferably has a thickness of between about 50 angstroms and 5 micrometers (more preferably between about 500 angstroms and 2000 angstroms), and preferably, the protection layer has a conductivity (to an alkali metal ion) of between about $10^{-8}$ and about $10^{-2}$ $(ohm-cm)^{-1}$. The parameters of protection layers used in examples of the present invention may be in similar ranges, for example a protection layer thickness may be between 5 nm (50 angstroms) and 200 nm. Such films, including glassy and amorphous layers described in U.S. Pat. No. 6,214,061 to Visco et al., may be used in batteries according to examples of the present invention.

Protective lithium ion permeable films deposited on a lithium electrode to stabilize the lithium electrode are also described in U.S. Pat. No. 5,589,291 to Carlin et al, who suggest that the stabilizing film is most likely lithium hydroxide or lithium oxide.

Protection layers may include phosphides or phosphates, sulfides or sulfates, nitrides (such as oxynitrides) or nitrates, oxides, hydroxides, borides, halides, and other salts. Protection layers may include compounds (or elemental films) of an alkali metal (such as lithium), transition metal (such as zirconium), group 14 element (such as germanium, silicon, or tin). Protection layers may comprise salts, alloys (intermetallic compounds), glasses, ceramics, ionic compounds, polymers, and/or other compounds, or some combination thereof.

The protection layer may include lithium salts such as sulfates (such as $Li_2S_2O_4$, $Li_2SO_3$, $Li_2S_2O_5$), perchlorates (such as $LiClO_4$), carbonates (such as $Li_2CO_3$), halides (fluorides, bromides, and chlorides such as LiCl), and other salts. Protection layers also include alkoxides such as lithium methoxide ($LiOCH_3$), other compounds of the form R—O—Li, salts of organic acids (such as R—$CO_2$Li), Protection layers may comprise carbon-containing material (such as graphite, fullerene, other carbonaceous material, and the like), oxides (for example a metal oxide such as a transition metal oxide, lithium oxide, or mixed oxide), hydroxides, metalorganic compounds, other transition metal compounds (such as a transition metal chalcogenide (sulfide etc.) or phosphide), a compound which forms intercalation compounds with lithium ions (such as titanium disulfide), a layer of solid electrolyte, glassy material, crystalline material, amorphous material, elastomer, sol-gel, polymer (such as a polyalklyene oxide, e.g. polyethylene oxide), polycarbonates, PVDF, and polymer complexes with lithium compounds), alloys, intermetallic compounds, and the like. Certain compounds may fall into one or more of the above categories.

The protection layer may be a thin solid film (such as an ion-porous glass or sol-gel), a gel layer, a polymer film, zeolite, carbon nanotube array or other carbon-containing film, or other film or layer.

Further examples of materials that can be included in protection layers include lithium silicate, lithium borate, lithium aluminate, lithium phosphate, lithium phosphorus oxynitride, lithium silicosulfide, lithium borosulfide, lithium aluminosulfide, and lithium phosphosulfide, combinations of one or more materials, and multilayer structures including such materials. Further examples of protection layer materials include 6LiI—$Li_3PO_4$—$P_2S_5$, $B_2O_3$—$LiCO_3$—$Li_3PO_4$, LiI—$Li_2O$—$SiO_2$, and $Li_xPO_yN_z$ (LiPON).

The protection layer may also include a glass layer or other compound. The glass may comprise an oxygenated lithium compound. A glass may includes at least one of a lithium silicate, a lithium borate, a lithium aluminate, a lithium phosphate, a lithium phosphorus oxynitride, a lithium silicosulfide, a lithium borosulfide, a lithium aluminosulfide, or a lithium phosphosulfide.

The protection layer may also be an electron-conductive material.

Solid Polymer Electrolyte

The protection layer may also be a thin layer of solid polymer electrolyte. A membrane of solid polymer electrolyte may be used to separate, for example, a lithium negative electrode from a molten salt electrolyte.

In other examples, a lithium metal negative electrode can be deposited on an electron collector, and then the remaining exposed surface of the lithium can be coated with a layer of solid polymer electrolyte. The polymer electrolyte helps protect the lithium metal from decomposition, facilitating fabrication of a lithium battery using a lithium metal negative electrode, and increasing the stability of such a battery.

A proton electrolyte membrane may be a polymer with appreciable alkali metal ion conductivity, for example. The thickness of the molten salt electrolyte layer may be greater than the thickness of the solid polymer electrolyte, for example over 5 times the thickness, or over 10 times the thickness. Hence, the ion conductivity of the solid polymer electrolyte may be relatively less significant than that of the molten salt electrolyte, allowing the safety features of a solid polymer electrolyte to be combined with the excellent ion conductivity properties of the molten salt electrolyte.

The protection layer may be an ormosil film or other silica based film, comprise a Nafion membrane, or may comprise another ion-conducting polymer. The protection layer thickness of a polymer electrolyte may be in the range 5 nm-200 microns.

Protection Layer Formation

The protection layer can form as a reaction between the negative electroactive material and the electrolyte, or between the negative electroactive material and a suitable additive within the electrolyte. The protection layer can be deposited on the negative electrode using chemical or physical deposition methods, such as evaporation, sublimation, physical vapor deposition, chemical vapor deposition, plasma treatment, sputtering, thermal treatment, photochemical treatment, silane treatment, sol-gel process, anodization, and the like.

The protection layer can be formed by any thin film coating or deposition process, alloy formation process, or other process. The protection layer may be used with, or formed by interaction with, an appropriate molten salt electrolyte, or other battery components.

The protection layer may be formed by depositing polymerizable materials on the surface of the negative electrode, and polymerizing in situ to form the protection layer. As used herein, the term polymerization includes copolymerization processes. For example, a solid polymer electrolyte layer may be formed by depositing precursor molecules, followed by polymerization, for example using UV. The precursor molecules may be organic or inorganic (such as silane derivatives).

The protection layer formation may take place at low temperatures (such as liquid nitrogen temperatures) or under an oxygen free atmosphere so as to inhibit reactions of the negative electroactive material during formation of the protection layer.

Protection layers can be formed by adding a small quantity of aqueous or organic material to the molten salt electrolyte, or may be formed by a reaction of a component of the molten salt electrolyte with the lithium electrode, or may be formed by a treatment of a Li metal electrode such as evaporative deposition of a component that reacts with Li to form a protective film. Protection layers can also (or alternatively) be formed on a positive electrode, for example using a composition or formation process as described herein. The protection layer may be formed by a reaction between a material within the molten salt electrolyte and the electron collector, on an initial charge or discharge of the cell.

Hence, in examples of the present invention, a lithium negative electrode, or other negative electrode, can be protected against reaction with the electrolyte using a protection layer.

The protection layer can be in the form of a sheet, or deposited as particles, such as a nanoparticle film. A nanoparticle film thickness may be approximately the average diameter of one nanoparticle or some multiple of the average diameter, such as 1 to 100 times the average diameter.

Positive Electrode

The positive electrode of a battery can be formed from any suitable material. A positive electrode for a lithium battery (for example, having a lithium negative electrode) may comprise a carbon-based material, such as graphite.

Example metal-sulfur batteries, such as lithium-sulfur batteries, include a positive electrode comprising an electroactive sulfur-containing material, for example as described in U.S. Pat. No. 6,569,573 to Mikhaylik. Electroactive sulfur-containing materials include elemental sulfur and sulfur compounds such as a lithium-sulfur compound (e.g. $LiS_x$), organosulfur compound, sulfur-containing polymer, sulfur/polymer composite material, and the like. The positive electrode may be solid. Examples of batteries according to examples of the present invention also include other lithium battery technologies, in which the positive electrode may comprise $SOCl_2$, $MnO_2$, fluorocarbons, and halogens such as iodine.

Protection layers according to the present invention may also be used in lithium-ion batteries, and, for example, a positive electrode for a lithium-ion battery may comprise lithium cobalt oxide ($Li_xCoO_2$), lithium manganese oxide ($Li_xMn_2O_4$), lithium nickel oxide ($Li_xNiO_2$), other lithium transition metal oxides, lithium metal phosphates, fluorinated lithium metal phosphates, and other lithium metal chalcogenides, where the metal can be a transition metal. The lithium content of the positive electrode or of the negative electrode can vary substantially with battery charge state.

The positive electrode may further include an electron-conducting material and a binder. Batteries according to examples of the present invention may also have protection layers associated with positive electrodes.

Other Electrode Components

An electrode (negative electrode or positive electrode) may further include non-electroactive materials such as an electron-conducting material. A non-electroactive material does not substantially interact with lithium in the electrolyte under normal operating conditions.

The electron-conducting material may comprise a carbon-containing material, such as graphite. Other example electron-conductive materials include polyaniline or other conducting polymer, carbon fibers, carbon black (or similar materials such as acetylene black, or Ketjen black), and non-electroactive metals such as cobalt, copper, nickel, other metal, or metal compound. The electron conducting material may be in the form of particles (as used here, the term includes granules, flakes, powders and the like), fibers, a mesh, sheet, or other two or three-dimensional framework.

An electrode may further include a binder, such as a polyethylene. The binder may be a fluoropolymer such as polytetrafluoroethylene. The binder may comprise one or more inert materials, for the purpose of improving the mechanical properties of the electrode, facilitating electrode manufacture or processing, or other purpose. Example binder materials include fluoropolymers (such as polytetrafluoroethylenes, polyvinylidene fluorides, and the like), polyolefins and derivatives thereof, polyethylene oxide, acrylic polymers (including polymethacrylates), synthetic rubber, and the like.

The electrode may further comprise regions of electrolyte, and/or an ion conductive protection layer to separate the negative electrode from the electrolyte, or other component or components. Electrodes may further comprise other non-electrically conducting, non-electroactive materials such as inert oxides, polymers, and the like.

Battery Configurations

An example lithium battery includes a positive electrode, a negative electrode, an electrolyte, the electrolyte including lithium ions. An example battery may further include first and second current collectors, associated with negative electrode and positive electrode respectively. Examples of the present invention include other non-aqueous electrolyte secondary (rechargeable) batteries).

An example battery may further include electrical leads and appropriate packaging, for example a sealed container providing electrical contacts in electrical communication with the first and second current collectors.

Batteries may further include one or more separators, located between the negative electrode and positive electrode with the purpose of preventing direct contact between the negative electrode and the positive electrode. The separator is optional, and a solid electrolyte may provide a similar function. A separator may be a porous material, including a material such as a polymer (such as polyethylene or polypropylene), sol-gel material, ormosil, glass, ceramic, glass-ceramic, or other material, and may be in the form of a porous sheet, mesh, fibrous mat (cloth), or other form. A separator may be attached to a surface of one or both electrodes.

OTHER APPLICATIONS

Other applications of the negative electrodes described herein include other alkali ion batteries, other rechargeable batteries, other electrochemical devices, and the like.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Prov. Pat. App. Ser. Nos. 60/553,621 and 60/553,457, both filed Mar. 16, 2004, are incorporated herein in their entirety.

I claim:

1. A battery comprising:
    a negative electrode, containing a negative electroactive material;
    a positive electrode;
    a molten salt electrolyte located between the negative electrode and the positive electrode; and
    a protection layer including zirconium, the protection layer separating the molten salt electrolyte and the negative electrode material, the negative electroactive material being supported on an electron collector, wherein the negative electroactive material is lithium metal.

2. The battery of claim 1, wherein the protection layer transmits lithium ions between the molten salt electrolyte and the negative electroactive material.

3. The battery of claim 1, wherein the molten salt electrolyte includes a lithium salt.

4. The battery of claim 1, wherein the battery is a lithium-ion battery.

5. The battery of claim 1, wherein the battery is a lithium-sulfur battery, the positive electrode including an electroactive sulfur-containing material.

6. The battery of claim 5, wherein the molten salt electrolyte prevents dissolution of $Li_2S_x$ species, where $1 \geq x \geq 8$.

7. The battery of claim 1, wherein the positive electrode is carbon, a lithium transition metal oxide, a lithium metal phosphate, or a lithium metal chalcogenide.

8. A battery, containing a negative electroactive material;
a positive electrode;
a molten salt electrolyte located between the negative electrode and the positive electrode; and
a protection layer including a sulfide, a phosphide, or a boride, the protection layer separating the molten salt electrolyte and the negative electrode material,
the negative electroactive material being supported on an electron collector,
wherein the negative electroactive material is lithium metal.

9. The battery of claim 8, wherein the protection layer transmits lithium ions between the molten salt electrolyte and the negative electroactive material.

10. The battery of claim 8, wherein the molten salt electrolyte includes a lithium salt.

11. The battery of claim 8, wherein the battery is a lithium-ion battery.

12. The battery of claim 8, wherein the battery is a lithium-sulfur battery, the positive electrode including an electroactive sulfur-containing material.

13. The battery of claim 12, wherein the molten salt electrolyte prevents dissolution of $Li_2S_x$ species, where $1 \geq x \geq 8$.

14. The battery of claim 13, wherein the positive electrode is carbon, a lithium transition metal oxide, a lithium metal phosphate, or a lithium metal chalcogenide.

* * * * *